United States Patent [19]

Piralli

[11] 3,831,339
[45] Aug. 27, 1974

[54] READILY RELEASABLE CLAMPED SPLINE JOINT

[76] Inventor: Louis Piralli, 1800-Vevey-Fenil, Switzerland

[22] Filed: Dec. 13, 1971

[21] Appl. No.: 207,165

[30] Foreign Application Priority Data
Dec. 17, 1970 Switzerland...................... 18697/70
Dec. 1, 1971 Switzerland...................... 17454/71

[52] U.S. Cl. ........... 52/758 D, 52/753 K, 52/753 T, 52/754, 52/586
[51] Int. Cl. ............................................. F16b 5/06
[58] Field of Search 287/20.92 T, 20.92 G, 20.92 K, 287/189.36 D, 189.36 C, 20.924, 20.925, 20.926, 20.927; 52/584, 586, 458, 496

[56] References Cited
UNITED STATES PATENTS
| | | | |
|---|---|---|---|
| 163,559 | 5/1875 | Wiswell................ | 287/20.92 G UX |
| 1,026,516 | 5/1912 | Kierle.................... | 287/20.92 K UX |
| 1,489,274 | 4/1924 | Petty................................. | 52/282 X |
| 3,123,887 | 3/1964 | Boettner.................. | 287/20.92 K X |
| 3,185,267 | 5/1965 | Pavlecka..................... | 287/189.36 D |
| 3,512,819 | 5/1970 | Morgan et al. ....................... | 52/586 |

*Primary Examiner*—Jordan Franklin
*Assistant Examiner*—Wayne L. Shedd
*Attorney, Agent, or Firm*—Robert E. Burns; Emmanuel J. Lobato; Bruce L. Adams

[57] ABSTRACT

Two plaster panels with peripheral grooved frames are assembled by a tongue member comprising two pairs of resilient flanges extending from opposite sides of an elongate web, one of the flanges of each pair having an outer lateral protuberance resiliently engaging in a correspodning recess in the respective groove. The web may be extended by a lateral wing passing between and protruding from the surfaces of the adjacent panels, and the structure reinforced by a wedge-shaped key member passing through an aperture in the wing and bearing against the adjacent surfaces of the panels.

6 Claims, 3 Drawing Figures

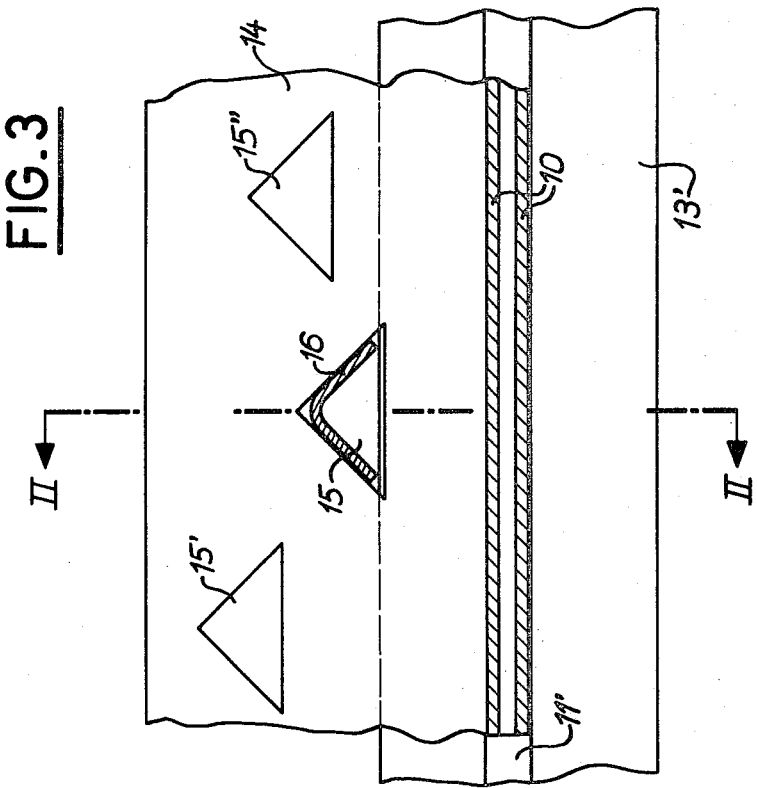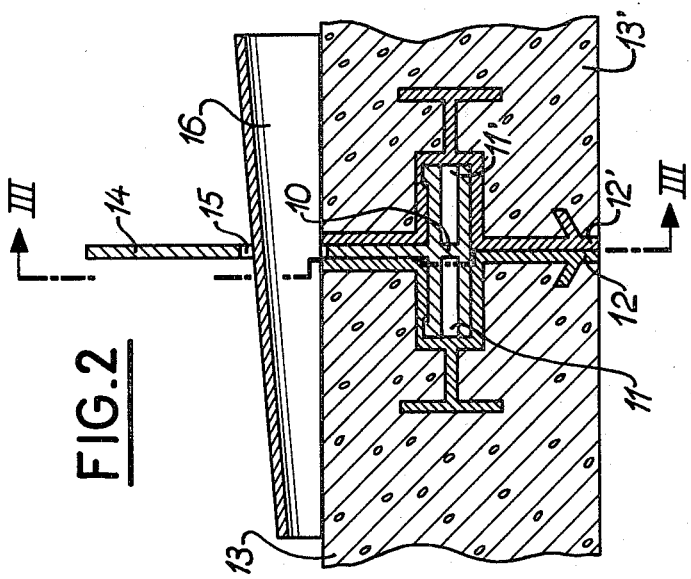

READILY RELEASABLE CLAMPED SPLINE JOINT

This invention relates to the assembly of construction elements such as panels for walls, partitions and so on.

Plaster is a material whose properties make its use desireable in habitable structures, but the use of plaster proves to be difficult because of its fragility and weight. The use of construction elements in the form of plaster panels strengthened by an outer metallic frame and an inner reinforcement has therefore been proposed, the density and fragility of the panel being reduced by the addition of materials such as vegetable fibres to the plaster.

For fixing the panels in position, the frame is provided with grooves, facing grooves of adjacent panels cooperating with an inserted tongue. In order to be able to hold the two adjacent elements in position and withstand impacts which inevitably occur during assembly, these tongues must have a certain rigidity and hence an adequate thickness. Moreover, the grooves must have a sufficient width to be able to receive the tongues and, due to the sometimes difficult conditions during assembly, there must be a certain tolerance or play which means that once assembled the accurate holding in position of the panels is compromised.

It is therefore an aim of the invention to provide a groove-and-tongue joint assembly for structural elements which does not suffer from the above drawbacks.

According to the invention, there is provided a combination of a structural element in the form of a panel or the like having a peripheral rigid frame with a longitudinal groove therealong, and a tongue member insertable in the groove and including means for securing an adjacent structural element, in which the tongue member comprises a web, a pair of facing substantially parallel resilient flanges extending from the web, and an outer lateral protuberance on one of the flanges, said flanges being resiliently receivable in said groove, and said groove comprising a recess for cooperating with said protuberance so that the tongue member may be held in the groove by resilient engagement of said protuberance in said recess.

Embodiments of the invention will now be described, by way of example, with reference to the accompanying drawings, in which:

FIG. 2 is a similar cross-section taken along line II—II of FIG. 3 and in which the tongue member is provided with a protruding wing extending from the web; and FIG. 3 is a cross-section taken along line III—III of FIG. 2.

Figure 1:
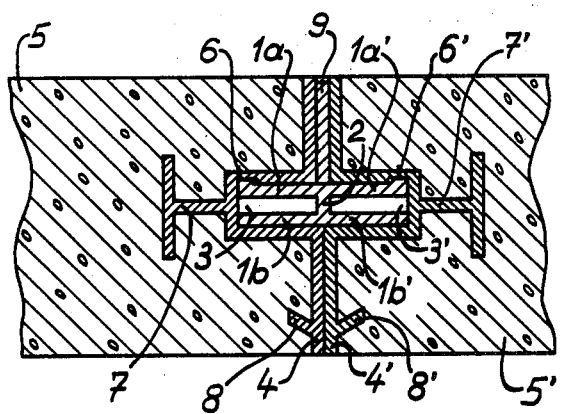
FIG. 1 is a cross-section through the edges of two panels connected together by means of a tongue member.

Referring to FIG. 1, the tongue member shown comprises two pairs of facing parallel tongues or flanges 1a, 1b and 1a', 1b' extending from opposite faces of a relatively short central web 2 perpendicular to the flanges. The tongue member is in a resilient material so that the flanges are resiliently deformable, the outer ends of the flanges 1a and 1a' having outwardly directed lateral protuberances 6 and 6' respectively.

Two panels 5, 5', for example of plaster or a composite plaster and fiber construction, are provided along at least one edge with a rigid metallic frame 4, 4' respectively anchored in the panel by means of projecting wings 8, 8' and substantially T-shaped anchor members 7, 7' respectively. The frames 4, 4' have longitudinal channel-like grooves 3, 3' extending therealong, the dimensions of these grooves corresponding substantially to those of the pairs of flanges 1a, 1b and 1a', 1b' which can be respectively resiliently inserted therein, a shallow recess being provided in the upper faces of these grooves (looking at FIG. 1) to receive the protuberances.

When two panels are fitted together, as shown, by means of one or several tongue members, a joint 9 is placed in a space provided between separated opposite faces on one side of the frames 4, 4'.

The dimensions of the various parts, in particular the length of the tongue member and the material of the tongue member, are chosen so that the tongue member by resilient engagement of the protuberances in the cooperating recesses securely holds the two panels 5, 5' together, but enables separation of the panels by the application of a sufficient force. Such tongue members are therefore particularly suited to hold the panels together during an assembly operation, the panels being subsequently rigidly secured by other means.

In the embodiment of FIGS. 2 and 3, the tongue member is provided with means to enable adjacent panels to be rigidly secured together. Two panels 13, 13' are held together by the flanges of an elongated tongue member 10 resiliently engaging in facing elongated grooves 11, 11' of frames 12, 12' on edges of the panels, as previously described. However, the web of the tongue member 10 is extended by a lateral wing 14 protruding perpendicularly from the flanges of one side, this wing 14 occupying the space previously filled by the joint 9. The wing 14 protrudes from the upper faces of the two panels 13, 13, looking at FIG. 2, and which would normally be rear or concealed surfaces of the panels.

The wing 14 is provided with a triangular orifice 15 one edge of which lies parallel to the surfaces of the panels and lies slightly below the surfaces of the panels. A wedge shaped key 16 with an overall triangular shape correspodning to the orifice 15 is forced through the orifice 15, after assembly of the two panels 13, 13' by means of the tongue member 10, so that it bears strongly against the surfaces of the panels 13, 13'. Since the key is transversal to the joint between the panels, the panels are rigidly secured together in alignment.

The wing 14, as shown, is advantageously provided with several orifices 15, 15', 15" at locations corresponding to panels of different thickness. Of course, depending on the length of the cooperating edges of the panels, several keys 16 through several orifices 15 along the same wing of the tongue member 10 will be used.

In both of the above described embodiments, the pairs of flanges are parallel. However, it is clear that, for example, slightly outwardly diverging flanges could be employed in cooperation with either U-shaped or slightly dovetailed grooves.

To facilitate insertion of the tongue member into a groove, the outer edges of each pair of flanges could be bevelled.

Instead of having two pairs of flanges extending from opposite sides of the web, the tongue members could have a single pair of flanges extending from one side of the web and insertable in a groove along a panel, the other side of the web being directly connected to a second panel, or having means for securing another panel. For example, this other side of the web could have an appropriately shaped wall extending therefrom and terminating with a second tongue member consisting of a web and a pair of flanges to which a second panel could be secured, whereby two non-directly adjacent panels can be held together. Another example is a wall extending from the other side of the web, said wall being directly secured to a second panel for the fixation of the two panels at a certain angle.

The groove in the frame of the panel or other structural element may in certain cases be conveniently located along a main surface of the panel adjacent to the edge, so that such a panel can be secured perpendicularly to a panel in which the groove is along the edge itself.

In a variant of the embodiment shown in FIGS. 2 and 3, the wing 14 could be extended and terminate with a second tongue member, similar to that shown, which in turn serves to hold together two further panels spaced apart from and parallel to the panels 13, 13', these further panels also preferably being securely fixed by means of wedge-like keys in corresponding orifices. Such an arrangement, which is a symmetrical doubling of the embodiment of FIGS. 2 and 3 about a plane parallel to the flanges 10, is particularly useful for providing double walled structures, for example double partitions.

What is claimed is:

1. A panel assembly comprising, two structural panels each having a peripheral edge abutting a peripheral edge of the other panel, means on each panel defining a groove extending on a corresponding peripheral edge of a respective panel, the grooves being disposed opposed to each other and in communication with each other, an elongated connecting member inserted in the two grooves releasably connecting said two structural panels in juxtapoxed relationship, said connecting member having in cross section a web disposed between the two panels outwardly of the grooves and two pairs of resilient tongues extending laterally therefrom on opposite sides of the web, means extending laterally from said web between the panels, each pair of said tongues having the tongues spaced from each other and opposed to each other, each pair of said tongues being made of a deformable material and disposed in a respective one of said grooves fitting snugly therein, said tongues having sufficient flexibility and memory to deform inwardly toward each other when being inserted into their respective grooves and to press outwardly against the inner boundaries of the corresponding groove when disposed therein and sufficient rigidity to releasably hold the panels in assembly.

2. A panel assembly according to claim 1, wherein each pair of said tongues has the tongues substantially normal to the web and are integral therewith.

3. A panel assembly according to claim 2, in which a tongue of each pair of tongues has a lateral protuberance thereon releasably locking the panels in juxtaposed relationship, each groove of each panel having a recess in communication therewith corresponding in cross section to a respective protuberance on the tongues receiving a respective protuberance for releasably locking said structural panels in juxtaposed relation.

4. For use in constructing a panel structure, at least two structural panels having a peripheral edge for abutting a peripheral edge of the other panel, means on each panel defining a groove extending on a corresponding peripheral edge of a respective panel, said grooves being disposed opposed to each other and in communication with each other when the two panels are assembled with said peripheral edges thereof abutting, an elongated connecting member insertable other than axially into the two grooves for releasably connecting the two panels juxtaposed along said peripheral edges thereof, said connecting member having in cross section a web disposed between the two panels outwardly of the grooves and two pairs of deformable tongues extending laterally from the web substantially normal thereto, said web having a lateral extension disposed between the panels and extending outwardly of an upper edge of the panels, said tongues of each pair being spaced from each other and opposed to each other, each tongue being made of a material for deforming toward each other when inserted lengthwise in a corresponding groove and having memory to restore itself to press outwardly against the inner boundaries of the corresponding groove and sufficient rigidity to releasably hold the panels in assembly when said panels are juxtaposed with said connecting member connecting them in assembled relationship.

5. For use in constructing a panel structure according to claim 4, in which a tongue of each pair of tongues has a lateral protuberance thereon for releasably locking the panels in assembled relationship, each groove of each panel having a lateral recess in communication therewith corresponding in cross section to a respective protuberance on said tongues for receiving said respective protuberance for releasably locking said structural panels in said assembled relationship.

6. For use in constructing a panel structure according to claim 4, in which said lateral extension of said web comprises a through opening having an edge below the level of said upper edge of the panel in a free condition, and a wedge inserted into said opening bearing against the upper edge of said panels and held in said opening, whereby the connecting member forcibly, releasably holds said panels in assembled relationship.

* * * * *